(12) United States Patent
Nakawaki

(10) Patent No.: US 8,947,700 B2
(45) Date of Patent: Feb. 3, 2015

(54) INFORMATION PROCESSING APPARATUS, INFORMATION PROCESSING METHOD, AND STORAGE MEDIUM TO PROVIDE A SCREEN

(75) Inventor: Jun Nakawaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 13/050,149

(22) Filed: Mar. 17, 2011

(65) Prior Publication Data

US 2011/0235111 A1   Sep. 29, 2011

(30) Foreign Application Priority Data

Mar. 24, 2010   (JP) .................................. 2010-068485

(51) Int. Cl.
*G06F 3/12* (2006.01)
*H04L 29/08* (2006.01)
(52) U.S. Cl.
CPC ............ *G06F 3/1288* (2013.01); *G06F 3/1205* (2013.01); *G06F 3/1267* (2013.01); *G06F 3/1272* (2013.01); *G06F 3/1287* (2013.01); *H04L 67/2819* (2013.01); *G06F 3/1204* (2013.01); *G06F 3/1208* (2013.01); *G06F 3/1238* (2013.01); *G06F 3/1269* (2013.01)
USPC ........................... 358/1.15; 358/1.9; 358/1.18
(58) Field of Classification Search
CPC .............................................. G06F 2209/5014
USPC ............................... 358/1.1–3.29; 399/81–83
See application file for complete search history.

(56) References Cited

U.S. PATENT DOCUMENTS

2004/0139402 A1* 7/2004 Azami .......................... 715/527
2004/0263870 A1* 12/2004 Itoh et al. ...................... 358/1.1
2006/0050307 A1* 3/2006 Koike .......................... 358/1.15
2009/0080022 A1* 3/2009 Tsutsumi ..................... 358/1.15

FOREIGN PATENT DOCUMENTS

JP        2004-351806 A     12/2004

* cited by examiner

*Primary Examiner* — Benny Q Tieu
*Assistant Examiner* — Marcellus Augustin
(74) *Attorney, Agent, or Firm* — Canon USA, Inc., IP Division

(57) ABSTRACT

An information processing apparatus includes a receiving unit and a provision unit. The receiving unit receives a display instruction regarding information about data whose printing is reserved from a device. The provision unit provides the device with a screen for displaying a reservation job including a print button for instructing print of data at a time of receiving reservation and a print button for instructing print of data at a time of receiving the display instruction in a case where the display instruction is received by the receiving unit and data at the time of receiving the reservation are different from data at the time of receiving the display instruction.

6 Claims, 15 Drawing Sheets

FIG.9

| PORTLET TYPE INFORMATION | OPERATION SETTING IN RESERVATION AND PRINT DATA COPY | COMPARISON METHOD |
|---|---|---|
| DOCUMENT MANAGEMENT | YES | 1. VERSION<br>2. FULL TEXT<br>3. DATE OF UPDATE<br>4. ANY PROPERTY |
| NEWS | YES | 1. FULL TEXT<br>2. ISSUE DATE |
| MAIL | NO | 1. NEW MAIL EXISTS IN THREAD<br>2. BODY TEXT<br>3. HEADER TEXT |

FIG.10

| CONDITION ID | PORTLET TYPE | DISPLAY CONDITION | DELETION CONDITION |
|---|---|---|---|
| 000 | DEFAULT | [PRINT]BUTTON: ALWAYS DISPLAYED | DELETE AFTER PRINTED ONCE |
| 001 | DOCUMENT MANAGEMENT | [PRINT] BUTTON: ALWAYS DISPLAYED [UPDATE PRINT] BUTTON: VERSION > VERSION IN PRINT RESERVATION OR FULL TEXT IS DIFFERENT | [DELETE] BUTTON: ALWAYS DISPLAYED |
| 002 | MAIL | [PRINT] BUTTON: ALWAYS DISPLAYED [UPDATE PRINT] BUTTON: THREAD LATEST MAIL > MAIL IN RESERVATION | [DELETE] BUTTON: DISPLAYED AFTER PRINTED ONCE |
| 003 | NEWS | [PRINT]BUTTON: DISPLAYED IF NEWS EXISTS | DELETE AFTER PRINTED ONCE |

FIG.11

| JOB NAME | PORTLET | URL TO BE PRINTED | DATE OF PRINT RESERVATION | CONDITION OF DISPLAY/ DELETION | PRINT BINARY |
|---|---|---|---|---|---|
| XX SPECIFICATIONS.doc | DOCUMENT MANAGEMENT | http://doc/xx SPECIFICATIONS.doc | 2009/09/20 12:00:00 | 001 | ALREADY COPIED |
| BUSINESS TRIP PLAN | MAIL | http://mail/mail?mailid=123 | 2009/09/01 13:24:30 | 002 | NO |
| RELEASE OF PRODUCT A | NEWS | | 2009/08/30 08:30:10 | 003 | NO |

FIG.15

| JOB NAME | PORTLET | INFORMATION IN RESERVATION | CURRENT INFORMATION |
|---|---|---|---|
| XX SPECIFICATIONS.doc | DOCUMENT MANAGEMENT | VERSION: 1.0 | VERSION: 2.0 |
| BUSINESS TRIP PLAN | MAIL | RECEPTION DATE: 2009/09/01 13:00:30 | RECEPTION DATE OF MAIL OF LATEST THREAD: 2009/09/20 09:00:24 |
| RELEASE OF PRODUCT A | NEWS | NO DATA | NO DATA |

INFORMATION PROCESSING APPARATUS, INFORMATION PROCESSING METHOD, AND STORAGE MEDIUM TO PROVIDE A SCREEN

BACKGROUND OF THE INVENTION

1. Field of the Invention

The present invention relates to an information processing apparatus, an information processing method, and a storage medium.

2. Description of the Related Art

In recent years, an improvement in web technique and easiness of maintenance have accelerated the shift of software to web. Among other things, a portal system in which a user can register only necessary functions has been in widespread use. The portal system associates user detachable interface components which are dubbed a portlet and functionally independent with a system framework called a portal. This allows the user to easily access all the associated portlets by accessing the portal system to use the portlet instead of accessing an individual portlet.

In a case where a multifunction peripheral (MFP) prints data stored in such portal system, there has been proposed a system allowing a simple print by selecting print data from a PC browser good in operability, reserving print, and performing only print instructions from the operation unit of the multifunction peripheral.

A technique discussed in Japanese Patent Application Laid-Open No. 2004-351806, for example, provides a method in which data existing in a specific Uniform Resource Locator (URL) in reserving print are held and the data in the URL in issuing instructions for print are compared therewith, if there is a difference therebetween, the latest data in issuing instructions for print are made printable. In the conventional technique, however, the characteristics of data existing in the URL are neglected and the latest data are always printed. In the portal system, the majority of data to be managed are shared and edited by a plurality of users. This causes a problem that data are updated before a device issues instructions for print, which resultantly, prints information which the use does not intend to print. Since a user interface (UI) is optimized so as to operate the portlets by a client computer, an operation through the MFP might be complicated, which causes a problem that the MFP is occupied by one user.

The present invention has been made in view of such problems and is directed to reduce user's burden on print and make printable print data which the user wants.

SUMMARY OF THE INVENTION

According to an aspect of the present invention, an information processing apparatus includes a receiving unit configured to receive a display instruction regarding information about data whose printing is reserved from a device and a provision unit configured to provide the device with a screen for displaying a reservation job including a print button for instructing print of data at a time of receiving reservation and a print button for instructing print of data at a time of receiving the display instruction in a case where the display instruction is received by the receiving unit and data at the time of receiving the reservation are different from data at the time of receiving the display instruction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates an example of a portlet type definition table.

FIG. 10 illustrates an example of a definition table for a display/deletion condition for print reservation job.

FIG. 11 illustrates an example of a print reservation job list.

FIG. 15 illustrates an example of a job data table.

DESCRIPTION OF THE EMBODIMENTS

Various exemplary embodiments, features, and aspects of the invention will be described in detail below with reference to the drawings.

The exemplary embodiment is described below with reference to the drawings.

Figure 1:
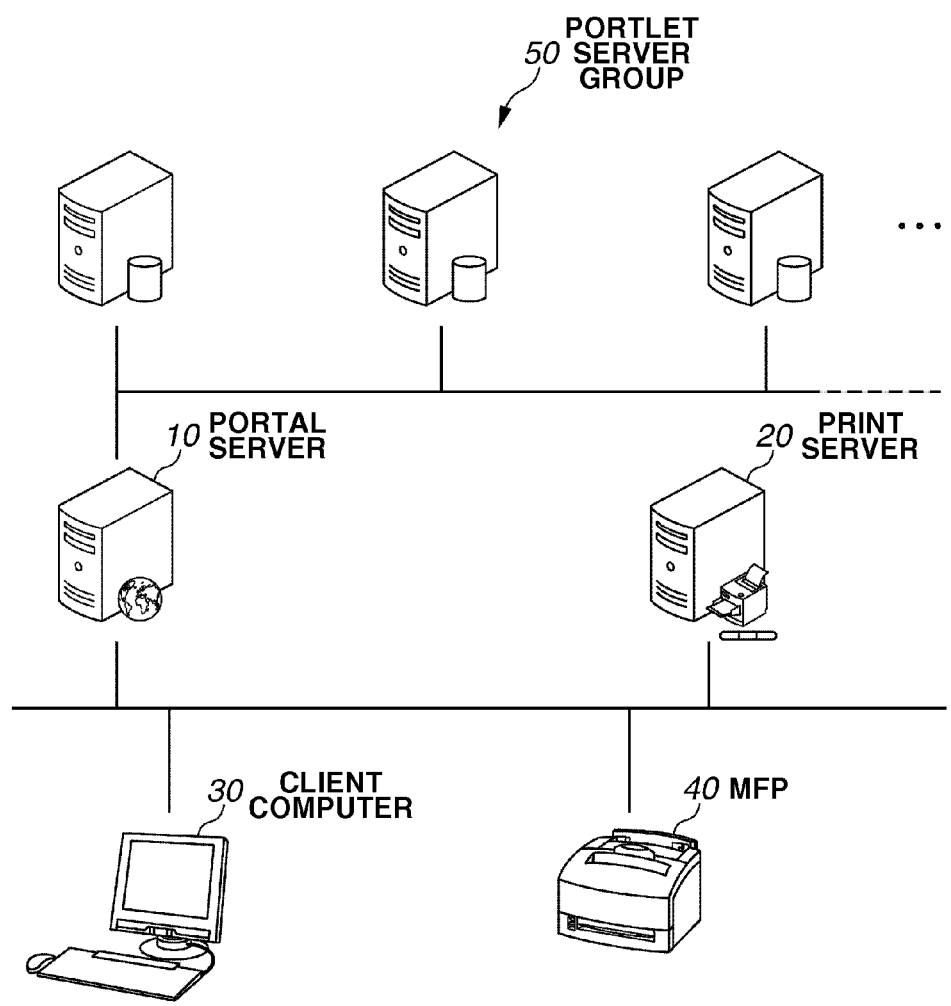
FIG. 1 is a schematic diagram illustrating an example of a configuration of a printing system according to an exemplary embodiment.

FIG. 1 is a schematic diagram illustrating an example of configuration of a printing system according to the exemplary embodiment.

A portal server 10 provides a portal system. More specifically, the portal system displays a screen including a plurality of portlets illustrated in FIG. 6, for example.

A portlet server group 50 provides an application function and includes a storage being an example of a storage region for storing application data.

A client computer 30 is used for a user to access the portal system.

A print server 20 being an example of an information processing apparatus communicates with each server of the portlet server group 50, acquires data, and manages print reservations.

A multifunction peripheral (MFP) 40 is an image forming apparatus for performing print.

Each component is a computer or an image forming apparatus composed of a central processing unit (CPU), a random access memory (RAM), a read-only memory (ROM), a hard disk drive (HDD), and others. Each process of the undermentioned flowchart related to the functions and processes of each apparatus is realized by the CPU of each apparatus executing the programs stored in a storage device such as an HDD.

Figure 2:
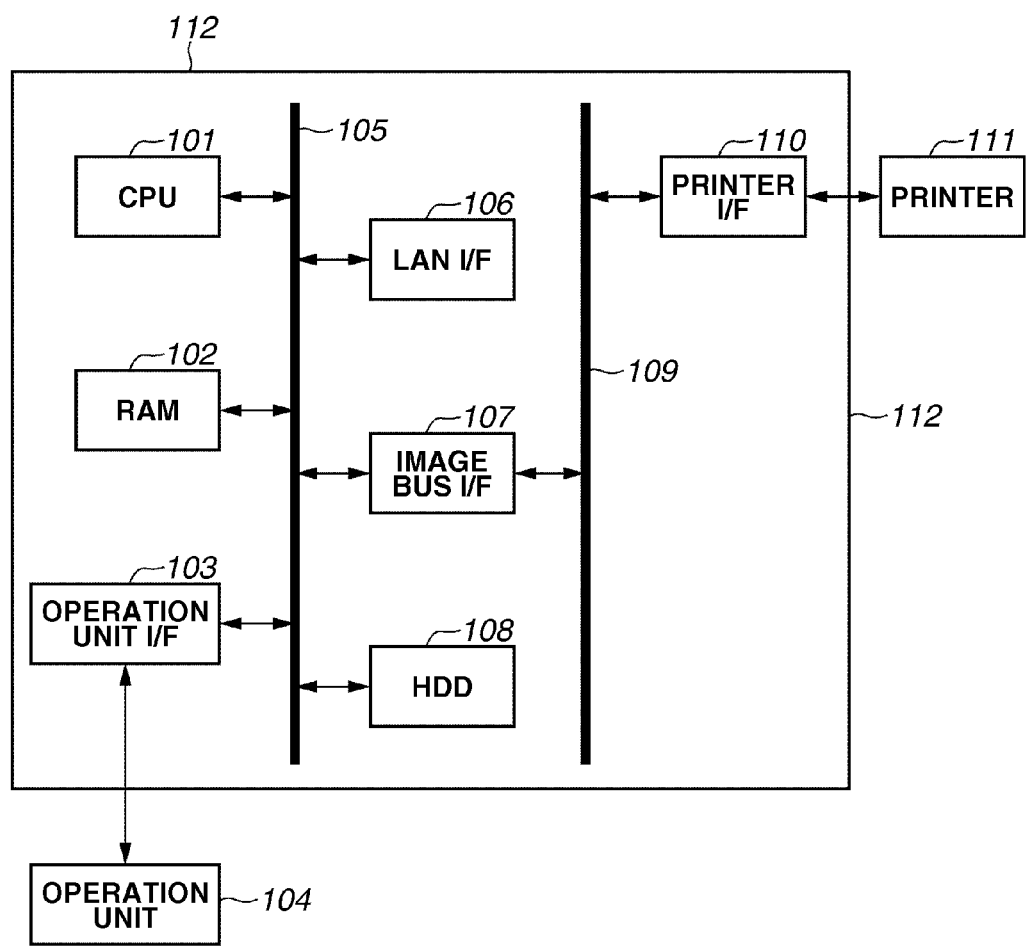
FIG. 2 illustrates a hardware configuration of a controller unit of an image forming apparatus.

FIG. 2 illustrates a hardware configuration of the controller unit of the image forming apparatus. The controller unit 112 is connected to a printer 111 functioning as an image forming apparatus to print image data.

A CPU 101 is a processor for controlling the entire image forming apparatus.

A RAM 102 is a rewritable non-volatile memory and records various control programs for controlling the printing system.

An operation unit interface (I/F) 103 interfaces with an operation unit 104 and outputs image data to be displayed on the operation unit 104. The operation unit I/F 103 plays the role of transferring information input by the user through the operation unit 104 to the CPU 101.

The above devices are arranged on a system bus 105.

An image bus I/F 107 is a bus bridge for connecting the system bus 105 to an image bus 109 for transferring image data at a high speed and converting data structure. The image bus 109 is composed of a protocol control information (PCI) bus or Institute of Electrical and Electronics Engineers (IEEE) 1394.

The devices described below are arranged on the image bus 109.

An printer I/F 110 interfaces with the printer 111 to print image data. The image data are generated by developing print data transmitted by the print server in the MFP.

The operation unit 104 has a liquid crystal display (LCD) display unit on which a touch panel sheet is attached. The operation unit 104 also includes an operation key. The operation unit 104 displays an operation screen for the system and informs the CPU 101 of positional information when the displayed key is pressed.

A local area network (LAN) interface 106 is a function unit interfacing with a LAN and is used for receiving image files from a personal computer (PC) or server via the LAN or acquiring information about other devices.

Figure 3:
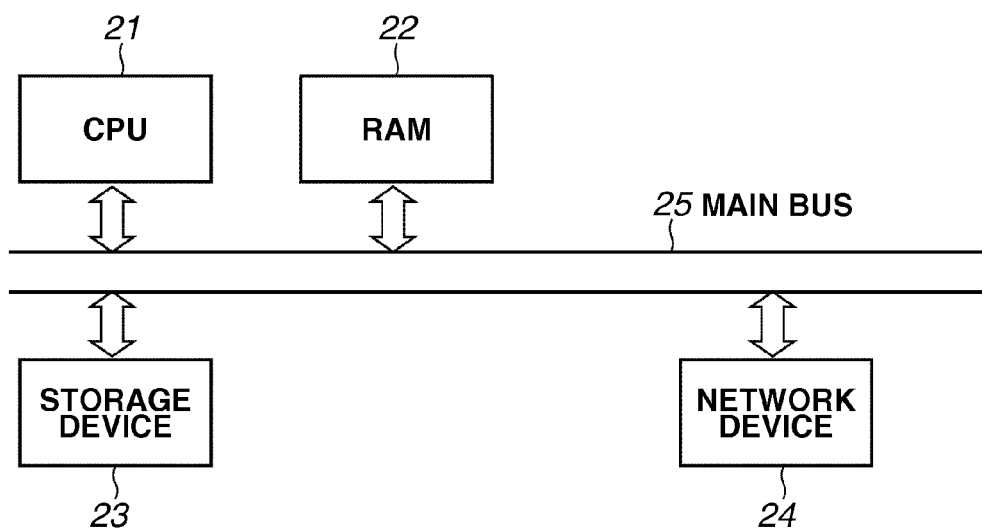
FIG. 3 is a block diagram illustrating an example of a hardware configuration of a portal server, each server of portlet server group, or a print server.

FIG. 3 is a block diagram illustrating an example of a hardware configuration of the portal server 10, each server of the portlet server group 50, or the print server 20. Each apparatus is composed of a CPU 21, a RAM 22 for providing the work area of the CPU 21, a storage device 23, a network apparatus 24 for communicating with other devices through a network, and a main bus 25.

Figure 4:
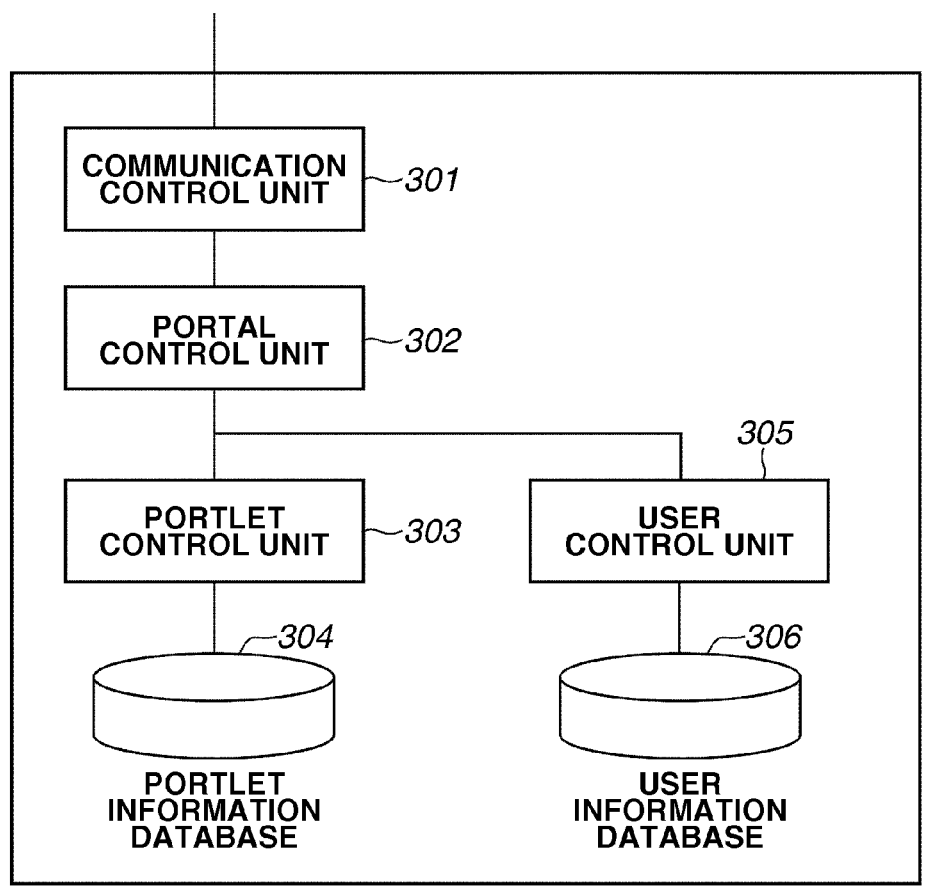
FIG. 4 is a block diagram illustrating an example of a functional configuration of the portal server.

FIG. 4 is a block diagram illustrating an example of a functional configuration of the portal server 10.

A communication control unit 301 transfers information to and from the portlet server group 50, the print server 20, the client computer 30, and the MFP 40 via the network according to the instructions of a portal control unit 302.

The portal control unit 302 controls the communication control unit 301, a portlet control unit 303, and a user control unit 305 to control the process of the portal server.

The portlet control unit 303 communicates with a portlet information database 304 according to the instructions of the portal control unit 302 to control portlet information such as the acquisition, addition, or deletion of a portlet.

The user control unit 305 communicates with a user information database 306 according to the instructions of the portal control unit 302 to control user information such as the acquisition, addition, or deletion of portlet setting information for each login user.

Figure 5:
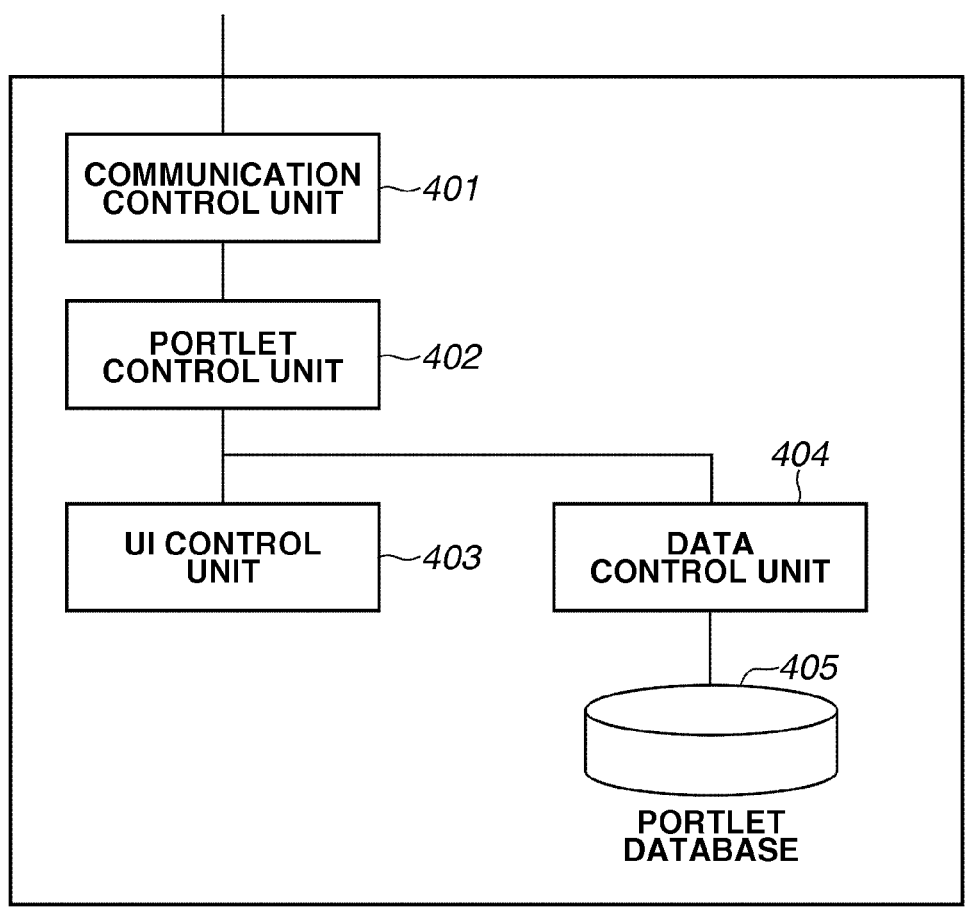
FIG. 5 is a block diagram illustrating an example of a functional configuration of the portlet server group and the print server.

FIG. 5 is a block diagram illustrating an example of a functional configuration of the portlet server group 50 and the print server 20.

A communication control unit 401 transfers information to and from the portal server 10 via the network according to the instructions of a portlet control unit 402.

The portlet control unit 402 controls the communication control unit 401, a UI control unit 403, and a data control unit 404 to control the process of the portlet server.

The UI control unit 403 performs UI control such as the generation of UI according to the instructions of the portlet control unit 402. The data control unit 404 communicates with a portlet database 405 according to the instructions of the portlet control unit 402 to store and provide portlet data.

Figure 6:
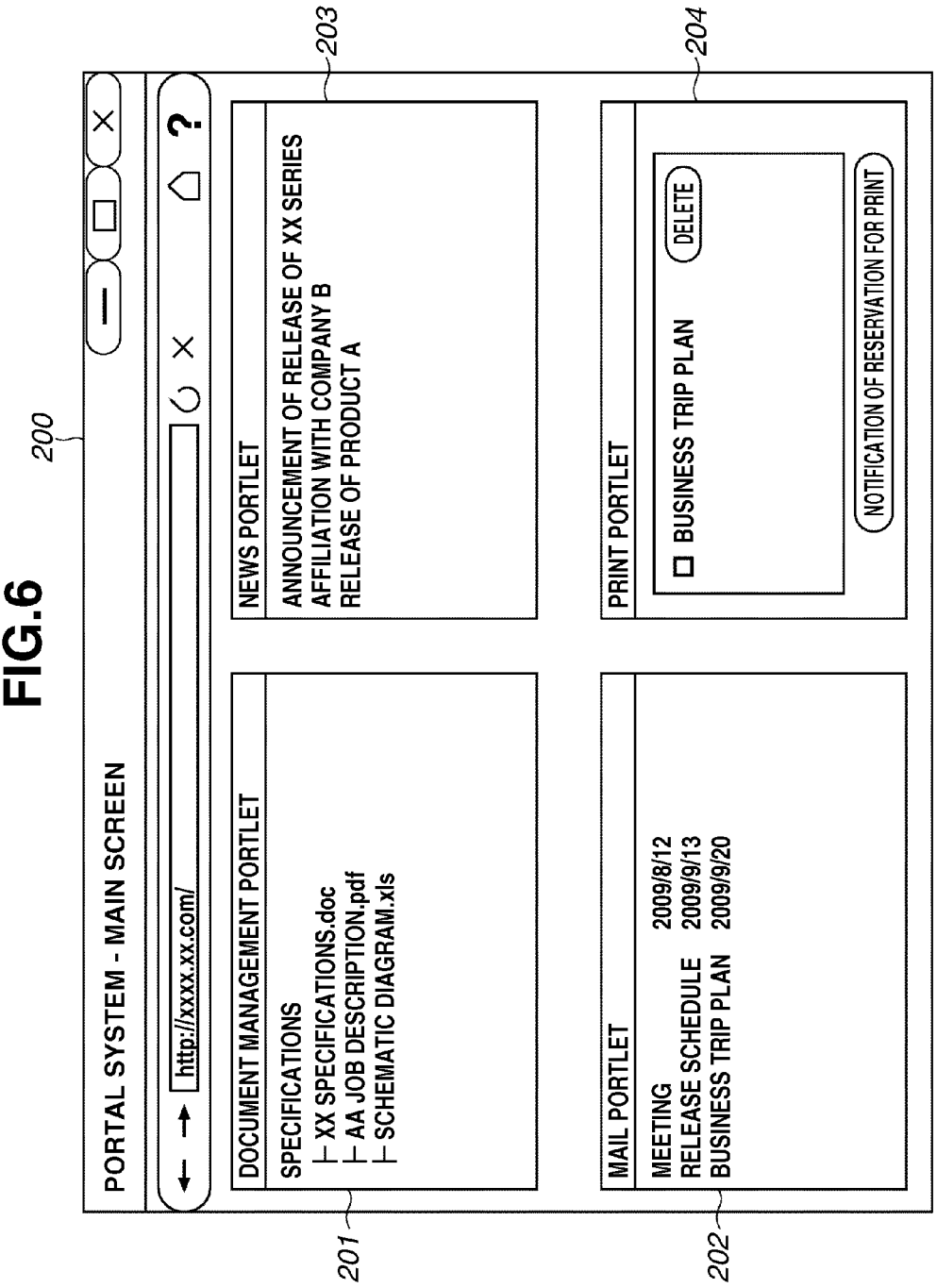
FIG. 6 is a diagram illustrating an example of a screen of a portal system.

FIG. 6 illustrates an example of a screen of the portal system.

The main screen 200 is the one for the portal system and a UI displayed in a case where the client computer 30 accesses the portal server 10. The UI is generated by the portlet server group 50 and the print server 20 via the portal server 10 and displayed by the client computer 30. Information to be displayed is contents reflecting settings different among login users and the contents to be displayed differ among the users and the settings.

The main screen 200 of a portal system is composed of several portlets. The main screen 200 in FIG. 6 includes the portlets 201 to 204.

Application portlets 201 to 203 are software operated by the portlet server group 50. The software provides functions such as document management, mailer, and newsreader. The kind and function of the portlet do not limit the present exemplary embodiment.

The print portlet 204 is software which collaborates with the portal server 10 and is operated by the print server 20. The print portlet 204 provides functions such as the addition and deletion of print reservation and the management of print data.

The flow of the process in the present exemplary embodiment is described below.

Figure 7:
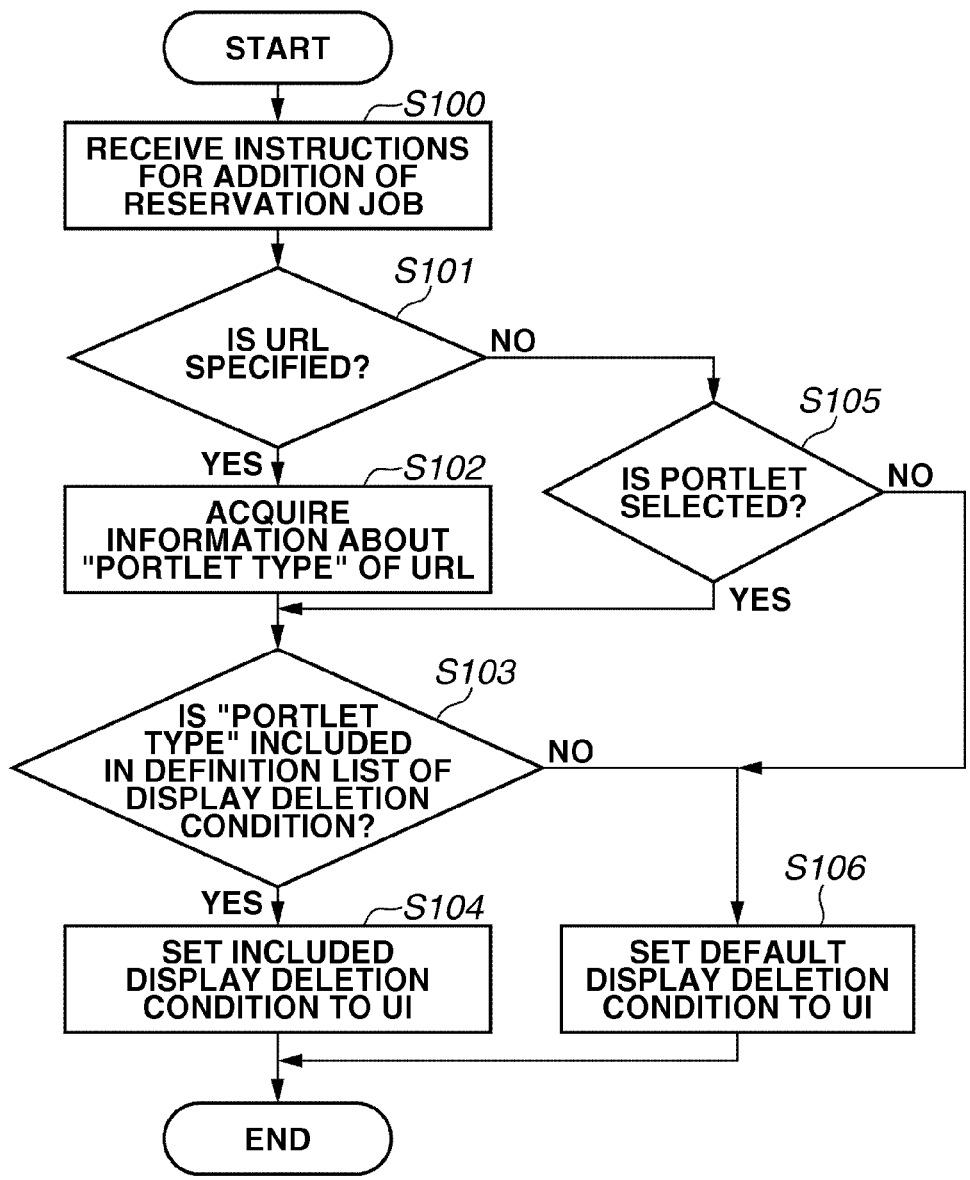
FIG. 7 is a flowchart illustrating an example of a process for adding print reservation in a print portlet.

FIG. 7 is a flowchart illustrating an example of a reservation process of print data in the print portlet 204.

Figure 8:
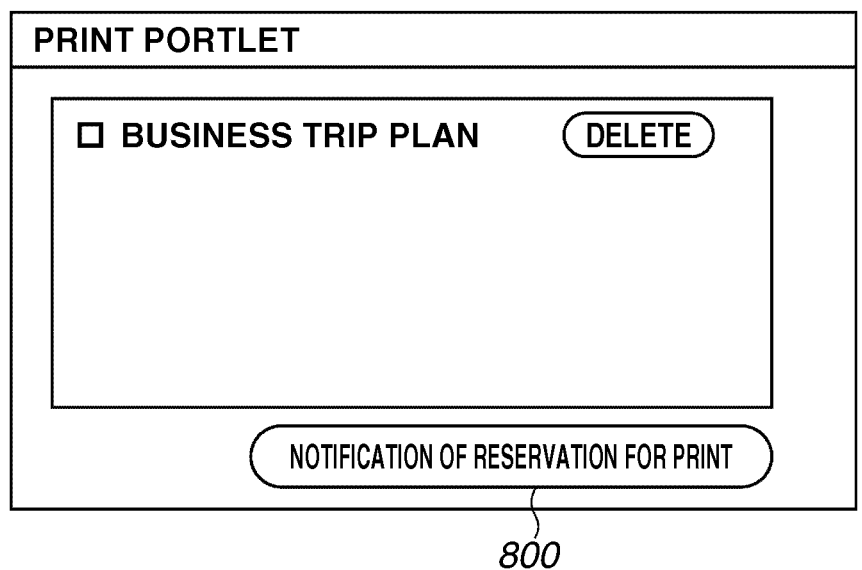
FIG. 8 illustrates an example of a screen for a print reservation job list for the print portlet.

The process is started by the client computer 30 accessing the main screen 200 of the portal system. For the sake of simplicity of the following description, we suppose that the CPU of the print server 20 performs the process of each step in the flowchart. In step S100, the CPU receives instructions for an addition of reservation for print being an example of a request for adding a reservation job of print data. For example, the instructions for the addition of reservation for print are transmitted from the client computer 30 to the print server 20 by the user selecting a notification of reservation for print 800 in FIG. 8, which is the print portlet 204 in FIG. 6. Alternatively, for example, the instructions for the addition of reservation for print are transmitted from the client computer 30 to the print server 20 by the user dragging and dropping a document link from each portlet illustrated in FIG. 6 to the print portlet. For example, the user selects "Business trip plan" in the mail portlet in FIG. 6 and drags and drops it onto the print portlet 204 to transmit the instructions for the addition of reservation for print to the print server.

In step S101, the CPU determines whether a specific data URL, being an example of specification information for specifying data, is specified in "the instructions for the addition of reservation for print" received in step S100. If the specific data URL is determined to be specified in "the instructions for the addition of reservation for print" (YES in step S101), the CPU proceeds to step S102. If the user selects not the specific data URL but the notification of reservation for print 800 in FIG. 8 (NO in step S101), the specific data URL is not specified in "the instructions for the addition of reservation for print," so that the CPU proceeds to step S105.

In step S102, the CPU identifies the portlet type corresponding to the URL specified in step S101 and acquires information corresponding to the portlet type from a portlet type definition table illustrated in FIG. 9. For example, the print server is provided with a correspondence table between the URL and the portlet type to realize the process in step S102.

The portlet type definition table illustrated in FIG. 9 includes operation setting in reservation and a method of comparing print data which are associated with the portlet type. The operation setting in reservation is the one asking whether the copy of data existing in the URL specified in executing the process in FIG. 7 is stored in the print server 20 as print data. The comparison method in FIG. 9 shows a list of the conditions (condition information) used for comparing the data existing in the specified URL with the print data copied and stored according to the abovementioned copy setting.

For the document management portlet, as described later, the CPU compares document data. Document properties stored in the document management portlet such as document version, update data and hour and others are used to compare whether document data are updated in the document. Alternatively, document data are compared using all pieces of text information written in the document.

Most news portlets are realized by using a data feed technique such as a Resource Description Framework (RDF) site summary (RSS). If such a portlet is used, the CPU compares whether data are updated based on the issue date of news or the text of its body.

For the mail portlet, a specific mail is never updated after it is received in terms of the characteristic of the mail. For this reason, the CPU determines whether the latest mail exists in thread using thread information instead of comparing whether the mail is updated, thereby making new information printable. If data in print reservation are never updated in future like mail, the CPU does not need to copy data in reservation.

In step S103, the CPU searches whether the portlet type specified in step S102 is included in a definition table of a display/deletion condition illustrated in FIG. 10. If the portlet type specified in step S102 is included in the definition table of a display/deletion condition (YES in step S103), the CPU proceeds to step S104. If the portlet type is not included (NO in step S103), the CPU proceeds to step S106.

The definition table of a display/deletion condition illustrated in FIG. 10 manages display and deletion conditions for a print relation button and a display condition for a deletion relation button for each portlet type. In the following embodiments, the "button" includes an indication portion displayed on the LCD or a hardware button and so on. A user or an IT manager can input various instructions by operating the "button". Information about the comparison method in the portlet type definition table in FIG. 9 may be used as the conditions in FIG. 10. The definition table of a display/deletion condition in the present exemplary embodiment manages the conditions for "print" button display, "update print" button display, "delete" button display, and the deletion process of a displayed button. As illustrated in FIG. 10, the display and deletion conditions are associated with the portlet type and stored in the definition table of a display/deletion condition.

Figure 12:
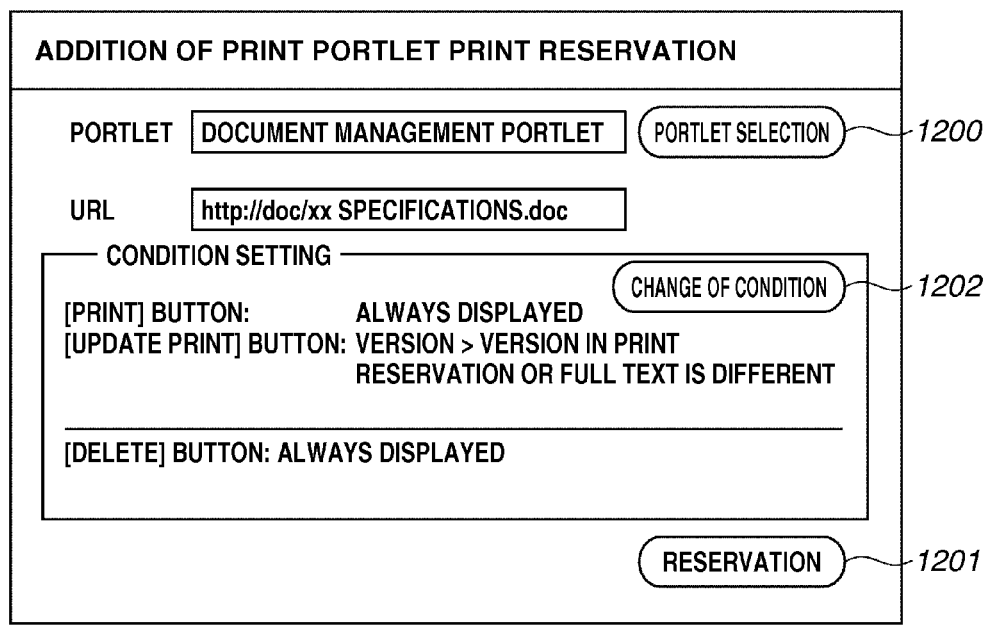
FIG. 12 illustrates an example of a screen for adding print reservation in the print portlet.

In step S104, the CPU reflects the definition of a display/deletion condition found in step S103 in a print reservation addition UI being an example of an additional screen in FIG. 12 of the print portlet 204 and displays the UI.

If the URL is not specified in step S101 and it is unclear to make reservations for printing of what data, the CPU executes this step S105 and specifies print data to be reserved. If the portlet is selected (YES in step S105), in other words, if selection information indicating the selected portlet is included in the instructions for the addition of reservation for print, the CPU proceeds to step S103. If the portlet is not selected (NO in step S105), the CPU proceeds to step S106. Even if print data are not specified in step S105, reservation job of print data can be added. The CPU is performed the process in step S105, which enables the user to set a comparison condition under which print data generated in future can be checked and reserve print when data are generated. For example, registering a keyword in the news portlet allows the user to reserve print when news matching with the keyword is issued.

In step S106, because print data to be reserved are not specified, the CPU reflects in UI the default value existing in the definition of a display/deletion condition in the print portlet 204 in FIG. 10. The use of a "change of condition" button 1202 in FIG. 12 allows the user to set a condition which does not exist in the definition of a display/deletion condition in FIG. 10. Pressing a "reservation" button 1201 causes the CPU to copy data existing in the specified URL to the print portlet 204 according to the setting and add the reservation job of the data to the print reservation job list in FIG. 11.

The print reservation job list in FIG. 11 holds a job name, a portlet in which the original data of the job name exist, a URL, reservation addition data and hour, a key to the definition of a display/deletion condition in FIG. 10, and the print data copied in addition.

Figure 13:
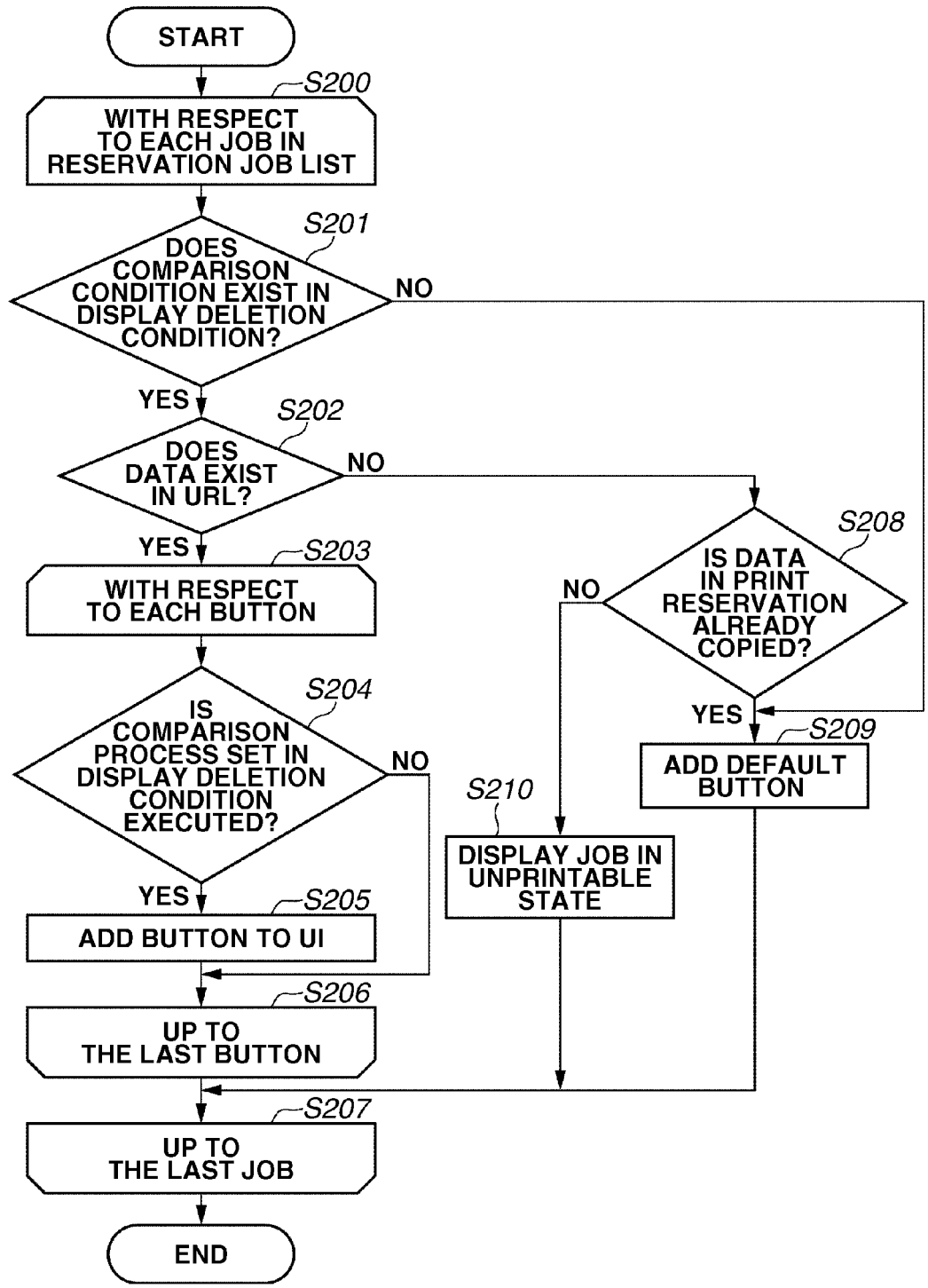
FIG. 13 is a flowchart illustrating an example of a process for displaying the print reservation job list.
Figure 14:
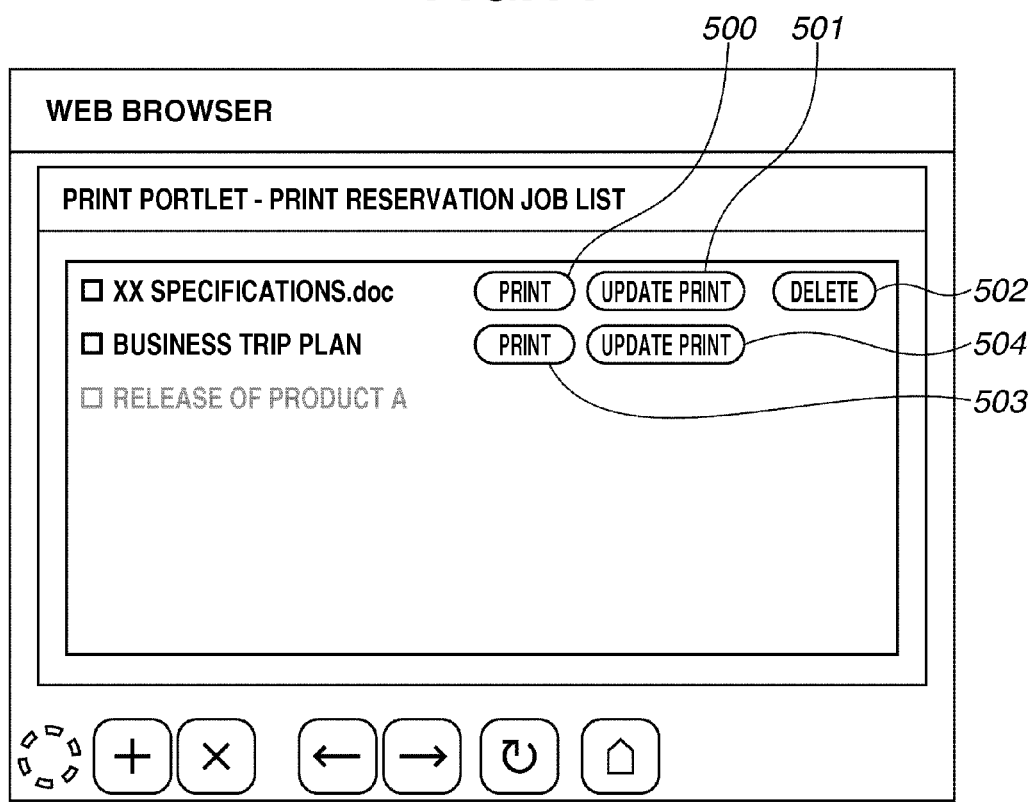
FIG. 14 illustrates an example of a screen for the print reservation job list.

FIG. 13 is a flowchart illustrating an example of the process for displaying the print reservation job list in FIG. 14 on the MFP.

The MFP 40 accesses the print portlet 204 via the portal system, i.e., issues instructions for the display of the print reservation job. If the print portlet 204 is accessed by the MFP 40, the following process for displaying the print reservation job list UI on the MFP in FIG. 14 is executed. The following description is made on the assumption that the CPU of the print server 20 executes the process of each step in the flowchart.

The CPU repeatedly executes all the reservation jobs existing in the print reservation job list in FIG. 11 from steps S200 to S207.

In step S201, the CPU confirms whether a display/deletion condition is set. In a case where "XX specifications.doc" in FIG. 11 is an object to be processed, for example, the CPU determines "YES" in step S201, since the condition ID is set to the display/deletion condition in FIG. 11.

In step S202, the CPU confirms whether printable data exist in the address shown by the URL to be printed. In a case where "XX specifications.doc" in FIG. 11 is an object to be processed, for example, the CPU determines that printable data exist, since the place where data are stored is described in the URL to be printed in FIG. 11. On the other hand, in a case where "release of product A" in FIG. 11 is an object to be processed, the CPU determines that printable data do not exist, since the place where data are stored is not described in the URL to be printed in FIG. 11.

The CPU repeatedly executes each button of "print" button display, "update print" button display, and "delete" button display from steps S203 to S206.

In step S204, the CPU executes the comparison process set in the display/deletion condition.

In step S205, the CPU displays (display controls) the corresponding button on the UI (display screen) according to the comparison result in step S204.

In step S206, if the CPU executes the processes of all the buttons, the CPU proceeds to step S207. If there is a button still to be processed, the CPU proceeds to step S203.

If the CPU executes the processes of all the reservation jobs, in step S207, the CPU ends the process of the flowchart. If there is a reservation job still to be processed, the CPU proceeds to step S200.

If the CPU determines that data do not exist in the URL (NO in step S202), in step S208, the CPU checks whether data to be printed in reserving print are copied. The checking process is realized by checking the items of print binary in FIG. 11. If the data are copied (YES in step S208), the CPU proceeds to step S209. If the data are not copied (NO in step S208), the CPU proceeds to step S210.

In step S209, since the CPU cannot identify the display/deletion condition, the CPU displays the button on the UI according to default setting in the definition of a display/deletion condition in FIG. 10.

In step S210, since there are no print data, the CPU displays the state, where print cannot be made, on the UI.

The following description is an example in which the UI in FIG. 14 is displayed by executing the process in FIG. 13 for the reservation list in FIG. 11. Information about respective data of the reservation job list at the time of reservation and information about respective data of the reservation job list in FIG. 11 at the time of executing the process in FIG. 13 are shown in FIG. 15. For example, from FIG. 15, it can be seen that the version of "xx specifications.doc" at the time of reservation is updated at the time of executing the process in FIG. 13.

The CPU of the print server 20 generates the reservation job list UI illustrated in FIG. 14 by performing the process using the tables illustrated in FIGS. 9 and 10 in the state indicated by the information illustrated in FIG. 15.

Specifically, the CPU of the print server 20 identifies, from the URL, that the type of the portlet for "xx specifications.doc" is "document management". The CPU refers to "display condition" of "document management" in the portlet type in FIG. 10 to recognize that "print button" is set at "always displayed." For that reason, as illustrated in FIG. 14, "print" button (print button) 500 for "xx specifications.doc" is displayed. In FIG. 10, on the other hand, for the case of "document management" in the portlet type, "version>version in print reservation or full text is different" is set as a display condition for "update print" button. Referring to FIG. 15, the current version is later than the version at the time of reservation, so that "update print" button 501 for "xx specifications.doc" is displayed as illustrated in FIG. 14. "Delete" button 502 for "xx specifications.doc" is displayed by the similar processing. If the delete button is specified, print data of a target reservation job are deleted from the print server. If the print button is specified, a print is output based on the print data stored in the print server. In other words, even though a document is updated, the document at the time of reservation is printed. If the update print button is specified, the document at the time of specifying the button is printed. More specifically, if a document is updated at the time of reserving print, the updated document is printed.

The CPU executes the similar processing also for "business trip plan" to display "print" button 503 and "update print" button 504. On the other hand, the condition for displaying "delete" button for "business trip plan" is set at "displayed after printed once," so that "delete" button is displayed after print.

The condition for displaying "print" button for "release of product A" is set as "data exist," so that "print" button is not displayed as illustrated in FIG. 14 until news related to "release of product A" is issued.

According to the present exemplary embodiment, the portal system frequently updating data allows printing data which the user wants. A print reservation being a complicated operation is made possible by a familiar client computer to enable simplifying a user's print operation in the MFP, allowing reducing staying time at the MFP.

An embodiment can reduce user's burden on print and make printable print data which the user wants.

Aspects can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may store a program that causes an information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-068485 filed Mar. 24, 2010, which is hereby incorporated by reference herein in its entirety.

What is claimed is:

1. An information processing apparatus, comprising:
a receiving unit configured to receive a display instruction regarding information of data whose printing is reserved;
a first determining unit configured to determine, in a case where first data and second data are reserved as data to be printed, a type of the first data and a type of the second data;
a second determining unit configured to determine whether a delete button for deleting data is needed or not needed based on the determined types of the first data and the second data;
a provision unit configured to provide a device with a screen including a first print button for instructing print of data at a time of receiving reservation for the first data and a second print button for instructing print of data at a time of receiving the display instruction for the first data and the delete button for the first data and including the first print button for the second data and the second print button for the second data in a case where the second determining unit determines that the first data needs the delete button and that the second data does not need the delete button and the display instruction is received by the receiving unit and data at the time of receiving the reservation are different from data at the time of receiving the display instruction, wherein the first and second print buttons for the first data and the first and second print buttons for the second data are concurrently displayed, and wherein the screen does not include the delete button for the second data; and a setting unit configured to set a condition for displaying the first print button for instructing print of data at the time of receiving the reservation for each category of data to be printed.

2. The information processing apparatus according to claim 1, wherein the provision unit compares information about a version of data at the time of receiving the reservation with information about a version of data at the time of receiving the display instruction to determine whether both data are different from each other.

3. An information processing method of controlling an information processing apparatus, the information processing method comprising:

receiving a display instruction regarding information of data whose printing is reserved;

determining, in a case where first data and second data are reserved as data to be printed, a type of the first data and a type of the second data;

determining whether a delete button for deleting data is needed or not needed based on the determined types of the first data and the second data;

providing a device with a screen including a first print button for instructing print of data at a time of receiving reservation for the first data and a second print button for instructing print of data at a time of receiving the display instruction for the first data and the delete button for the first data and including the first print button for the second data and the second print button for the second data in a case where determining includes determining that the first data needs the delete button and that the second data does not need the delete button and the display instruction is received and data at the time of receiving the reservation are different from data at the time of receiving the display instruction, wherein the first and second print buttons for the first data and the first and second print buttons for the second data are concurrently displayed, and wherein the screen does not include the delete button for the second data; and setting a condition for displaying the first print button for instructing print of data at the time of receiving the reservation for each category of data to be printed.

4. The information processing method according to claim 3, further comprising: comparing information about a version of data at the time of receiving the reservation with information about a version of data at the time of receiving the display instruction to determine whether both data are different from each other.

5. A non-transitory computer-readable storage medium storing a program that causes a computer to execute an information processing method, the information processing method comprising:

receiving a display instruction regarding information of data whose printing is reserved;

determining, in a case where first data and second data are reserved as data to be printed, a type of the first data and a type of the second data;

determining whether a delete button for deleting data is needed or not needed based on the determined types of the first data and the second data; and providing a device with a screen including a first print button for instructing print of data at a time of receiving reservation for the first data and a second print button for instructing print of data at a time of receiving the display instruction for the first data and the delete button for the first data and including the first print button for the second data and the second print button for the second data in a case where determining includes determining that the first data needs the delete button and that the second data does not need the delete button and the display instruction is received and data at the time of receiving the reservation are different from data at the time of receiving the display instruction, wherein the first and second print buttons for the first data and the first and second print buttons for the second data are concurrently displayed, wherein the screen does not include the delete button for the second data, and wherein the information processing method further comprises setting a condition for displaying the first print button for instructing print of data at the time of receiving the reservation for each category of data to be printed.

6. The non-transitory computer-readable storage medium according to claim 5, wherein the information processing method further comprises comparing information about a version of data at the time of receiving the reservation with information about a version of data at the time of receiving the display instruction to determine whether both data are different from each other.

* * * * *